No. 850,650. PATENTED APR. 16, 1907.
D. B. HYDE.
BEARING FOR GRINDING WHEEL SHAFTS.
APPLICATION FILED JULY 24, 1903.
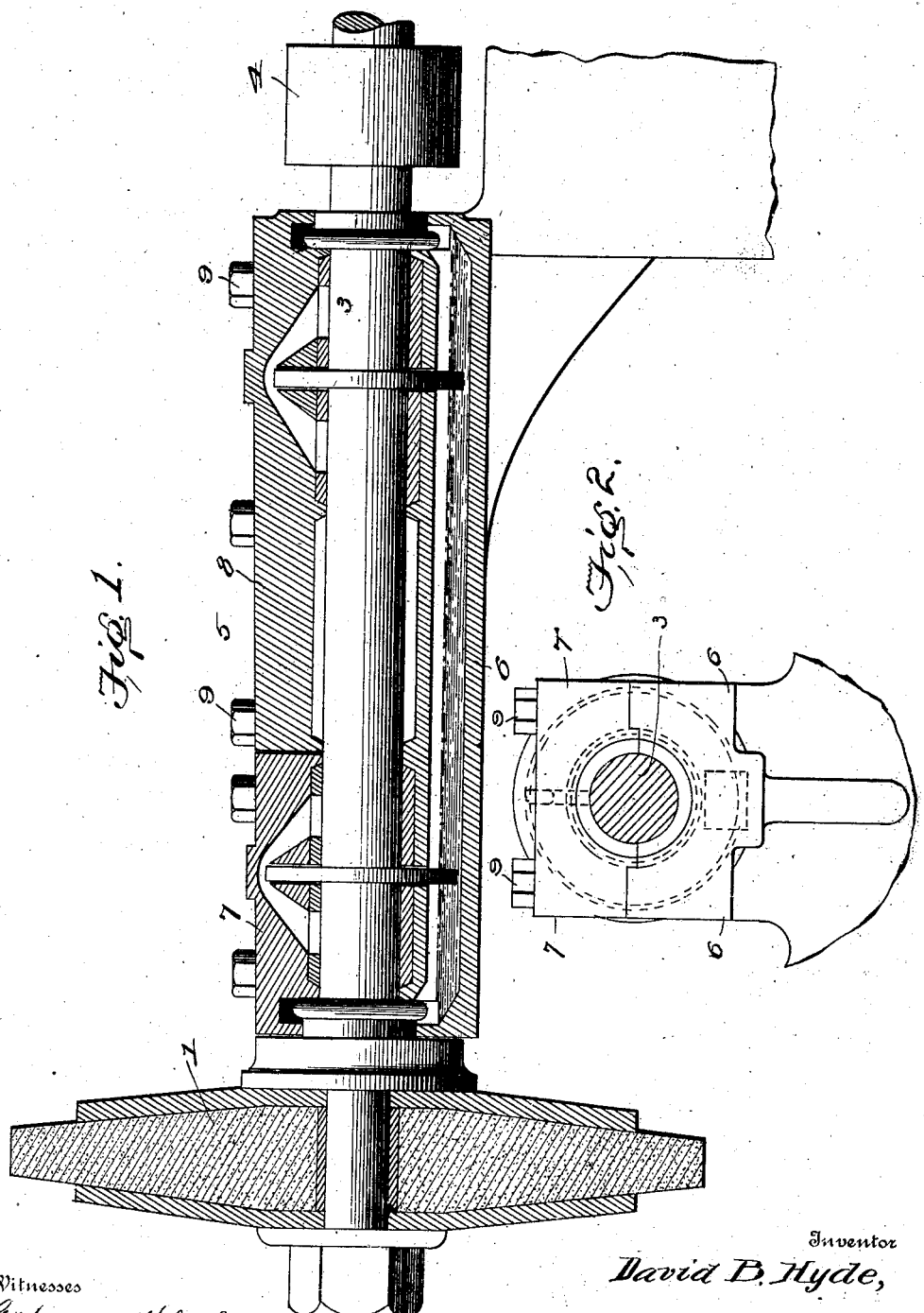
Witnesses
Inventor
David B. Hyde,

UNITED STATES PATENT OFFICE.

DAVID B. HYDE, OF SPRINGFIELD, OHIO, ASSIGNOR TO THE SAFETY EMERY WHEEL CO., OF SPRINGFIELD, OHIO, A CORPORATION OF OHIO.

BEARING FOR GRINDING-WHEEL SHAFTS.

No. 850,650.     Specification of Letters Patent.     Patented April 16, 1907.

Application filed July 24, 1903. Serial No. 166,821.

*To all whom it may concern:*

Be it known that I, DAVID B. HYDE, a citizen of the United States, residing at Springfield, in the county of Clark and State of Ohio, have invented certain new and useful Improvements in Bearings for Grinding-Wheel Shafts, of which the following is a specification, reference being had therein to the accompanying drawings.

This invention relates to bearings for grinding-wheel shafts, and is particularly adapted for application to long bearings of overhanging grinding-wheel shafts, its object being to permit the taking up of the unequal wear which occurs in such bearings.

To this end the invention consists in certain novel features which I will now proceed to describe and will then particularly point out in the claim.

In the accompanying drawings, Figure 1 is a longitudinal sectional view of a bearing embodying my invention, and Fig. 2 is a transverse sectional view of the same.

This invention is designed more particularly for use in connection with a machine comprising an overhanging shaft mounted in a long bearing and having on its projecting end the grinding-wheel against which the work is pressed from below by means of a suitable cradle or support. It results from this mode of operation that an excessive upward pressure comes upon the outer end of that portion of the shaft inclosed within the bearing, so that the bearing wears more at the outer than at the inner end. To remedy this difficulty, I have devised the construction shown in the drawings, in which 3 indicates the shaft, having the grinding-wheel 1 at its outer end and provided with a driving-pulley 4 at the outer end of the bearing. The bearing (indicated as a whole by the reference-numeral 5) comprises a horizontally divided bearing-box, the lower member of which is indicated at 6, said lower member being coextensive with the bearing. The upper member of the bearing consists of a front section 7 and a rear section 8, said sections being separate, and consequently independently adjustable. The front section is preferably much shorter than the rear section, and the adjustment of each section is effected by bolts 9 in the usual manner.

When the bearing has become worn, the wear is greater at the front end than at the rear end, so that the bearing requires tightening up at the front before said tightening up is required at the rear end. Furthermore, the front end of the bearing requires much more frequent tightening than the rear end. By dividing the upper member of the box, against which the thrust of the work chiefly comes, into two separate and independent sections I am enabled to adjust only so much of the bearing as requires tightening and may tighten it to the necessary extent without affecting the remainder of the bearing. The bearing is thus properly equalized and kept in proper condition with much less labor than is the case where the entire top member is in a single piece.

I do not wish to be understood as limiting myself strictly to the precise details of construction hereinbefore described, and shown in the accompanying drawings, as the same may be obviously modified without departing from the principle of my invention.

Having thus fully described my invention, what I claim as new, and desire to secure by Letters Patent, is—

In a bearing of the character described, a three-part bearing-box adapted to completely inclose the journal and comprising a continuous bottom portion extending throughout the length of said journal, an upper portion divided near one end to form two parts, the longer part being at that end which receives the minimum pressure from the journal and the shorter part being at that end which receives the maximum pressure from the journal, and independent means for adjusting each part of the upper portion of said bearing-box relatively to the lower portion thereof, whereby one end of said bearing may be tightened to take up wear without disturbing the other end thereof, substantially as described.

In testimony whereof I affix my signature in presence of two witnesses.

DAVID B. HYDE.

Witnesses:
    E. O. HAGAN,
    IRVINE WELLER.